Aug. 23, 1949.  F. L. EATON  2,479,560
CHUCK
Filed July 30, 1946
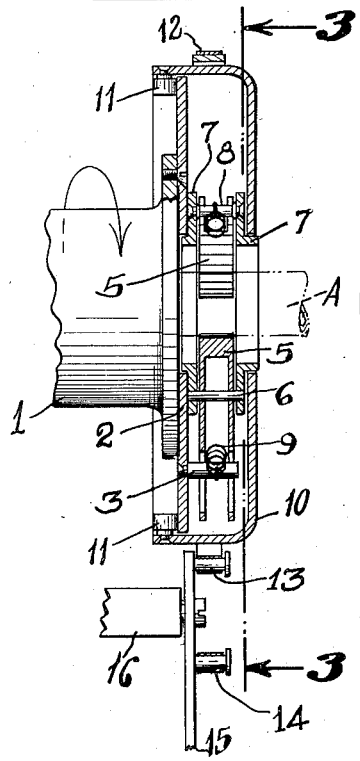
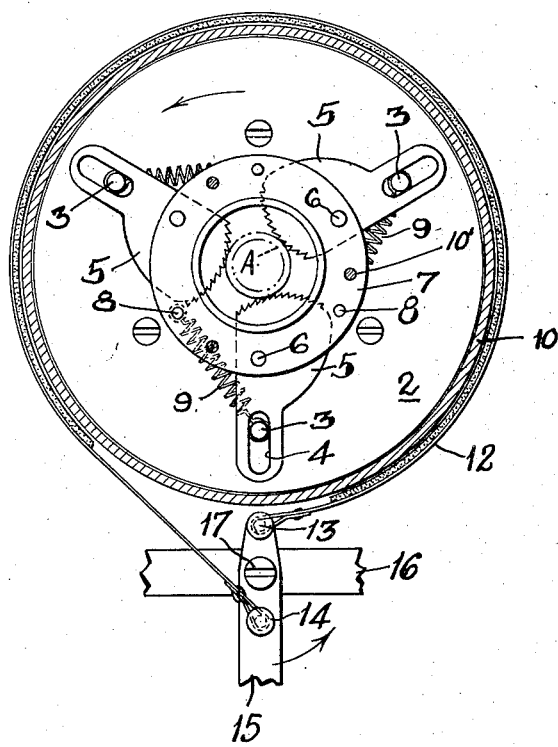
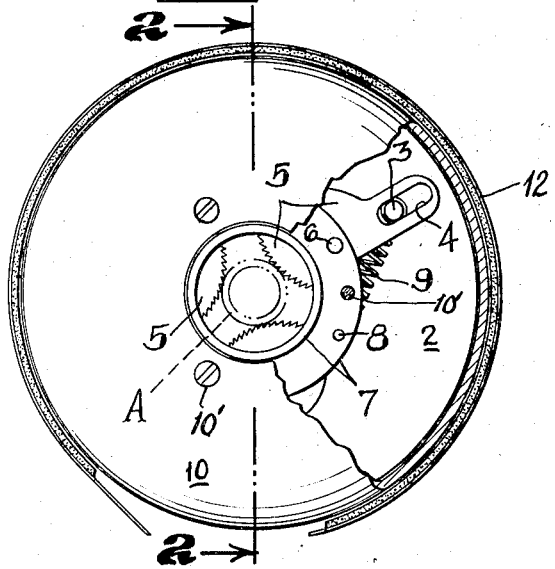
INVENTOR,
Fred L. Eaton
BY
J. E. Trabucco
ATTORNEY.

Patented Aug. 23, 1949

2,479,560

UNITED STATES PATENT OFFICE 2,479,560

CHUCK

Fred L. Eaton, San Francisco, Calif.

Application July 30, 1946, Serial No. 687,113

9 Claims. (Cl. 279—33)

This invention relates to improvements in pipe gripping chucks.

An object of my invention is to provide an improved chuck of the universal or self-centering type wherein the gripping jaws are simultaneously operated to engage or disengage with the work.

Another object of my invention is to provide an improved chuck of the kind characterized, embodying novel quick acting means for moving the pivoted jaws of the chuck into or out of gripping engagement with the work.

Other and further objects of my invention will be pointed out hereinafter or will be indicated in the appended claims, or will be obvious to one skilled in the art upon an understanding of the present disclosure. For the purpose of this application I have elected to show herein certain forms and details of a chuck representative of my invention; it is to be understood, however, that the embodiment of my invention herein shown and described is for the purpose of illustration only and that therefore it is not to be regarded as exhaustive of the variations of the invention.

In the accompanying drawings:

Fig. 1 is a front view of a universal chuck embodying the principles of my invention, showing parts broken away and in section;

Fig. 2 is a sectional view taken on the line 2—2 of Fig. 1; and

Fig. 3 is a sectional view taken on the line 3—3 of Fig. 2.

Referring to the drawings, the numeral 1 designates a tubular shaft or spindle which is suitably connected to means for rotating it. Secured as by screws to a flange formed on an end of the shaft is a ring shaped disc 2 which carries three uniformally spaced pins 3. The pins 3 extend through slots 4 formed in the bifurcated outer ends of gripping jaws 5, the said gripping jaws having ratchet type teeth at their inner arcuate ends for engaging with the work A which is to be securely held and rotated with the chuck. The gripping jaws are pivotally mounted between their ends on uniformly spaced fulcrum pins 6 secured to and extending between two annularly flanged ring shaped members 7 which are loosely centered with respect to the opening of the disc 2. The annular flange on the inner ring shaped member 7 extends inside the central opening of the disc 2 and prevents the lateral displacement of the said members with respect to the disc and the shaft 1. Connected at its ends to anchor pins 8 secured to the ring shaped members 7 and to the pins 3 carried by the disc 2 are helical tension springs 9 which provide means for operatively connecting the disc and said members 7 whereby the said members may be rotated with the shaft and the disc. Connected as by screws 10' to the outer ring shaped member 7 is a brake drum 10 which is formed with a central opening through which the annular flange of the outer ring shaped member extends. The drum extends in spaced relation around the periphery of the disc 2, and a number of rollers 11 carried by the said drum engage with the rear side of the said disc to normally maintain the drum in compact assembled relation with respect to the other parts of the chuck and to allow the relative rotative movement of the disc and the drum.

Extending around the drum is a flexible brake band 12 having an inner lining arranged in the usual manner for engagement with the said drum. The ends of the band are secured as at 13 and 14 to a hand lever 15 which is pivotally mounted on a support 16 as by a pivot screw 17. When the lower end of the hand lever is moved to the right as indicated by the arrow in Fig. 3, the brake band is contracted and brought into engagement with the drum, and a reverse movement of the lever disengages the said band from the drum. The tension of the helical springs 9 maintains the serrated inner ends of the gripping jaws in withdrawn positions when the shaft is not rotating. Each fulcrum pin 6 is eccentrically arranged with respect to the arcuate serrated end of its associated gripping jaw 5, thereby making it possible to move the said serrated end of the jaw inwardly into operative engagement with work members A of different diameters. The gripping jaws are arranged for simultaneous movement, thereby providing means for engaging with the work at three spaced points at the same time.

In operation the shaft 1 and disc 2 are rotated in a counterclockwise direction (Fig. 3), thereby causing the entire assembly to be carried in the same direction. The pipe or other work member A to be gripped and rotated is inserted inwardly between the serrated inner ends of the gripping jaws 5, and when so positioned the lever 15 is pulled to the right to contract the brake band 12 and momentarily retard or stop the rotation of the brake drum 10 and the ring shaped members 7. With the pins 3 continuing to travel with the disc 2 in a counterclockwise direction and the fulcrum pins 6 being momentarily stopped or retarded through the application of the brake means, the jaws are turned about the fulcrum pins 6, and at the same time a pull is exerted on the outer ends of the jaws 5 which extends the springs and increases their tension. The jaws being thus turned about their fulcrum pins 6, are actuated in a manner whereby their inner serrated ends are moved into gripping relation with the work member A. So long as a slight drag is applied through the brake band 12 or by other means to the drum 10 the gripping jaws will remain in firm gripping engagement with the work and the latter will rotate with the shaft. When the work is to be released the hand lever 15 is moved to a position whereby the brake band no longer exerts a retarding pressure on the brake drum 10. The springs 9 then being free to contract, pull the ring shaped members 7 in a counterclockwise direction into positions whereby the fulcrum pins 6 and the pins 3 are relatively closer, thereby causing the reverse turning of the jaws about the fulcrum pins and the movement of their inner serrated ends out of gripping engagement with the work.

What I claim is:

1. In a chuck, a rotatable driving element, an independently rotatable structure mounted on the driving element, a plurality of gripping jaws pivotally mounted at points between their ends on the independently rotatable structure, the inner ends of the jaws having arcuate work gripping edges and the pivotal points about which the jaws turn being eccentrically positioned with respect to the said arcuate gripping edges, the said jaws being slidably and pivotally connected at their outer ends to the driving element, spring means operatively connecting the outer ends of the jaws and the independently rotatable structure, whereby the said structure may be rotated with the driving element, and means for applying a drag to the independently rotatable element whereby the outer ends of the jaws may be moved by the driving element to turn the jaws about their pivot points to actuate the jaws into gripping engagement with an object positioned between their arcuate inner edges.

2. In a chuck, a rotatable driving element, an independently rotatable structure mounted on the driving element having an axial opening for receiving a work member, a plurality of uniformly spaced fulcrum pins arranged in circular formation on the independently rotatable structure, a plurality of gripping jaws pivotally mounted at points between their ends on the fulcrum pins, the inner ends of the jaws having arcuate work engaging edges arranged eccentrically with respect to the fulcrum pins and the outer ends of the jaws being slotted, a plurality of projecting members carried by the driving element and slidably positioned in the slots of the jaws, a plurality of springs operatively connecting the projecting members and the independently rotatable structure, and means for applying a drag to the independently rotatable structure whereby a pull will be exerted on the said structure opposing the rotation of the driving element and the jaws will be turned about the fulcrum pins to bring their inner ends into gripping engagement with the work and the springs will be tensioned to cause the reverse pivotal movement of the jaws when the drag on the said structure is discontinued.

3. In a chuck, a rotatable driving element, an independently rotatable structure mounted for rotation with the driving element and having an axial opening for receiving a work member, a plurality of uniformly spaced fulcrum pins secured to the independently rotatable structure and arranged around its axial opening, a plurality of gripping jaws pivotally mounted at points between their ends on the fulcrum pins, the jaws having inner arcuate work engaging edges arranged eccentrically with respect to the fulcrum pins and the outer ends of the jaws being slotted, a plurality of projecting members carried by the driving element and slidably positioned in the slots of the jaws, a plurality of springs operatively connecting the projecting members and the independently rotatable structure, and hand operated brake means for applying a drag to the independently rotatable structure to cause a pull to be exerted on the said structure opposing the rotation of the driving element, whereby the fulcrum pins and their associated projecting members will be relatively separated to turn the jaws about the fulcrum pins and bring the inner arcuate edges thereof into gripping engagement with the work member and the springs will be tensioned to reverse the pivotal movement of the jaws to release the work members when the brake means is actuated to remove the drag on the independently rotatable structure.

4. In a chuck, a rotatable driving element, an independently rotatable structure mounted for rotation with the driving element and having an axial opening for receiving a work member, a plurality of uniformly spaced fulcrum pins secured to the independently rotatable structure and arranged around its axial opening, a plurality of gripping jaws pivotally mounted at points between their ends on the fulcrum pins, the jaws having inner arcuate work engaging edges arranged eccentrically with respect to the fulcrum pins, a plurality of projecting members carried by the driving element and slidably engaging with the outer ends of the jaws, a plurality of tension springs operatively connecting the projecting members and the independently rotatable structure, and means for applying a drag to the independently rotatable structure to exert a pull on the said structure opposing the rotation of the driving element, whereby the fulcrum pins and their associated projecting members will be relatively separated to turn the jaws about the fulcrum pins and bring the inner arcuate edges thereof into gripping engagement with the work member and the springs will be tensioned to reverse the pivotal movement of the jaws to release the work member when the drag on the independently rotatable structure is removed.

5. A chuck comprising a driving disc having a central aperture, a flanged face plate rotatably secured to said disc with the flange slidably engaging the periphery thereof, said face plate also having a central aperture, a pair of flanged rings between said disc and face plate with their respective flanges extending into said apertures, means securing one of said rings to said face plate and the other of said rings having sliding contact between its flange and the surrounding wall of the aperture, a plurality of gripping jaws fulcrumed to said rings, each of said jaws having at its inner end a gripping surface eccentrically located with respect to its fulcrum, springs biasing said jaws to open position, and pins on said disc adapted to engage the outer ends of said jaws to move them to closed position when the face plate is retarded in its rotation relative to said driving disc.

6. A chuck comprising a pair of spaced centrally apertured discs, a peripheral flange on one of said discs extending beyond the other disc and having sliding contact with the periphery thereof, a plurality of jaws pivoted in a pair of flanged rings mounted in the space between said discs with their flanges extending into said apertures, one of said rings being fastened to one of said discs, and pins on the other disc engaging said jaws.

7. A chuck as set forth in claim 6 in which the said pins engage said jaws beyond their pivots.

8. A chuck comprising a pair of discs, a plurality of jaws pivoted to one of said discs, said jaws having gripping arcuate ends eccentrically located relative to their pivots and adapted to be moved into and out of operative position by movement about their pivots, pins on the other of said discs engaging slots in said jaws on the end remote from said gripping ends and with the pivots between, resilient means operatively connecting said discs and biasing said jaws to inoperative position, and means for retarding the rotation of the disc to which the jaws are pivoted relative to the other disc when it is driven to bring said jaws into operative position under positive force.

9. A chuck comprising a pair of discs at least one of which has a central opening, a plurality of jaws pivoted to one of said discs, said jaws having gripping ends adapted to be moved from an inoperative non-gripping position to an operative position gripping a work member in said central opening, resilient means biasing said jaws to the inoperative non-gripping position, means operatively connecting the other of said discs to each of said jaws at a point removed from the pivot, and means for retarding the rotation of one of said discs relative to the other disc when it is driven to bring said jaws into operative position under positive force of said connecting means.

FRED L. EATON.

REFERENCES CITED

The following references are of record in the file of this patent:

UNITED STATES PATENTS

| Number | Name | Date |
|---|---|---|
| Re. 15,643 | Thacker | July 3, 1923 |
| 868,471 | Oubridge | Oct. 15, 1907 |
| 1,812,221 | Spencer | June 30, 1931 |
| 1,915,705 | Webb | June 27, 1933 |